United States Patent [19]
Ross et al.

[11] Patent Number: 5,812,682
[45] Date of Patent: Sep. 22, 1998

[54] ACTIVE VIBRATION CONTROL SYSTEM WITH MULTIPLE INPUTS

[75] Inventors: Colin F. Ross, Great Shelford; Graham P. Eatwell, Caldecote, both of England

[73] Assignee: Noise Cancellation Technologies, Inc., Linthicum, Md.

[21] Appl. No.: 605,307

[22] Filed: Feb. 6, 1996

Related U.S. Application Data

[63] Continuation-in-part of Ser. No. 370,953, Jan. 10, 1995, abandoned, and Ser. No. 50,023, Jun. 11, 1993, abandoned.

[51] Int. Cl.$^6$ ................................................. H04R 25/00
[52] U.S. Cl. ................................... 381/71.11; 381/71.12
[58] Field of Search ........................ 381/71.1, 71.11, 381/71.12, 71.8, 92, 94, 96, 73.1

[56] References Cited

U.S. PATENT DOCUMENTS

4,815,139  3/1989  Eriksson et al. ........................ 381/94
5,091,953  2/1992  Tretter ................................. 381/71.12

*Primary Examiner*—Huyen D. Le

[57] ABSTRACT

An active vibration control system having at least two input sensors generating first signals representative of a primary vibration field, a plurality of actuators driven by second signals and producing a secondary vibration field, monitoring sensors responsive to both the primary and secondary vibration fields and producing third signals, and a controller having one output waveform generator for each second signal and responsive to the first signals to generate respective second signals so that vibration is reduced in a chosen region excited by both the primary and secondary fields, the controller being adaptive to adjust the waveform generator outputs to maintain the reduced vibration in this region.

18 Claims, 3 Drawing Sheets

ACTIVE VIBRATION CONTROL SYSTEM WITH MULTIPLE INPUTS

This is a continuation-in-part of Ser. No. 08/050,023, filed Jun. 11, 1993, now abandoned, and a continuation-in-part of Ser. No. 08/370,953, filed Jan. 10, 1995, now abandoned.

FIELD OF INVENTION

The invention relates to a system for actively controlling vibration. In common with previous methods it uses multiple actuators and sensors, but the improved method drives the actuators using output wave generators each of which is responsive to at least two input signals. In particular, unlike previous methods, the invention can be applied to the control of vibration from multiple sources irrespective of the degree of correlation between the sources.

BACKGROUND TO THE INVENTION

In the following the use of the word vibration shall include sound and other similar linear disturbances.

There have been many publications relating to the active control of vibration in solids and in fluids. They use one or more actuators to produce secondary vibration that tends to cancel an unwanted vibration in some region. Sensors in this region produce signals representative of the residual vibration. These signals (the residual signals) are used in a control system together with input signals to adjust the signals sent to the actuators.

Active control systems can be broadly categorized according to the type of input signals used. The first type uses input signals which are both time and amplitude related to the primary vibration or the combination of both primary and secondary vibration. The second type uses input signals which are time related to the primary vibration but contain no amplitude information. Active control systems can be broadly categorized according to the type of input signals used. The first type uses input signals which are both time and amplitude related to the primary vibration or The combination of both primary and secondary vibrations. The second type uses input signals which are time related to the primary vibration but contain no amplitude information.

This second type of system is usually used for controlling periodic or tonal vibrations and an example is described in UK patent 1,577,322 (Active Attenuation of Recurring Sounds, G. B. B. Chaplin).

When there is more than one source of vibration it is sometimes possible to use one control system for each source, provided that the sources are uncorrelated with each other.

Another method treats the vibration as if it were coming from a single source and to use a fast-adapting control system to compensate for the modulations caused by the interactions of the sources (UK patent 2,132,053 [Warnaka & Zalas], UK patent 2,126,837 [Groves], UK patent 2,149,614 [Nelson & Elliot]). This will only work if the sources are correlated over the time scale of the adaption process. It could not be used, for example, for controlling aircraft propeller noise when the synchrophaser is switched off, since modulations are then too rapid.

There are many applications where the vibration is produced by vibration sources which are at least partially correlated. One example of this is the generation of road noise inside a vehicle. There is some correlation between the vibration produced from each wheel as a result of road unevenness and in addition it is not always possible to position vibration sensors which are responsive to one wheel only.

Another example of this is when the vibration sources are tonal in nature. If the frequencies of the sources are very close together then the cross-correlation of the signals from the individual sources must be calculated over a long time before the correlation becomes negligible. There have been attempts to separate the signals in a reduced time by using phase information from the different sources (for example PCT/GB89/00913 [Eatwell & Ross], but this relies upon the frequencies remaining fixed and separate over the measurement time and makes the assumption that the sources are uncorrelated over some specific time period.

In many real applications not only do the frequencies change, but they can overlap. This is the case for example when two machines are connected by a clutch which can slip, when they are governed to run at the same nominal speed, or when they are linked with a control system such as a synchrophaser for aircraft propellers. In these cases it is often impossible to identify accurately which vibration is due to which source using the input signals only.

SUMMARY OF THE INVENTION

According to a first aspect of the present invention an active vibration control system comprises:

- at least two input sensors which generate first signals related to at least one characteristic of a primary vibration field or of the sources which generate the primary vibration field;
- a plurality of actuators driven by second signals which produce a secondary vibration field;
- a plurality of monitoring sensors responsive to the combination of the said primary and secondary vibration fields and which produce third signals;
- a controller including one output waveform generator for each second signal wherein each output waveform generator is responsive to the said first signals and generates one of the said second signals so that the combined effect of the second signals is that the vibration in a region, which is excited by the said primary and secondary vibration fields, tends to be reduced;
- characterized in that the input sensors generate first signals related to the phase and amplitude of the primary vibration field or of the sources which generate said field, and in that the controller adapts the output waveform generators so that the vibration in the region is maintained at a reduced level.

Figure 2:
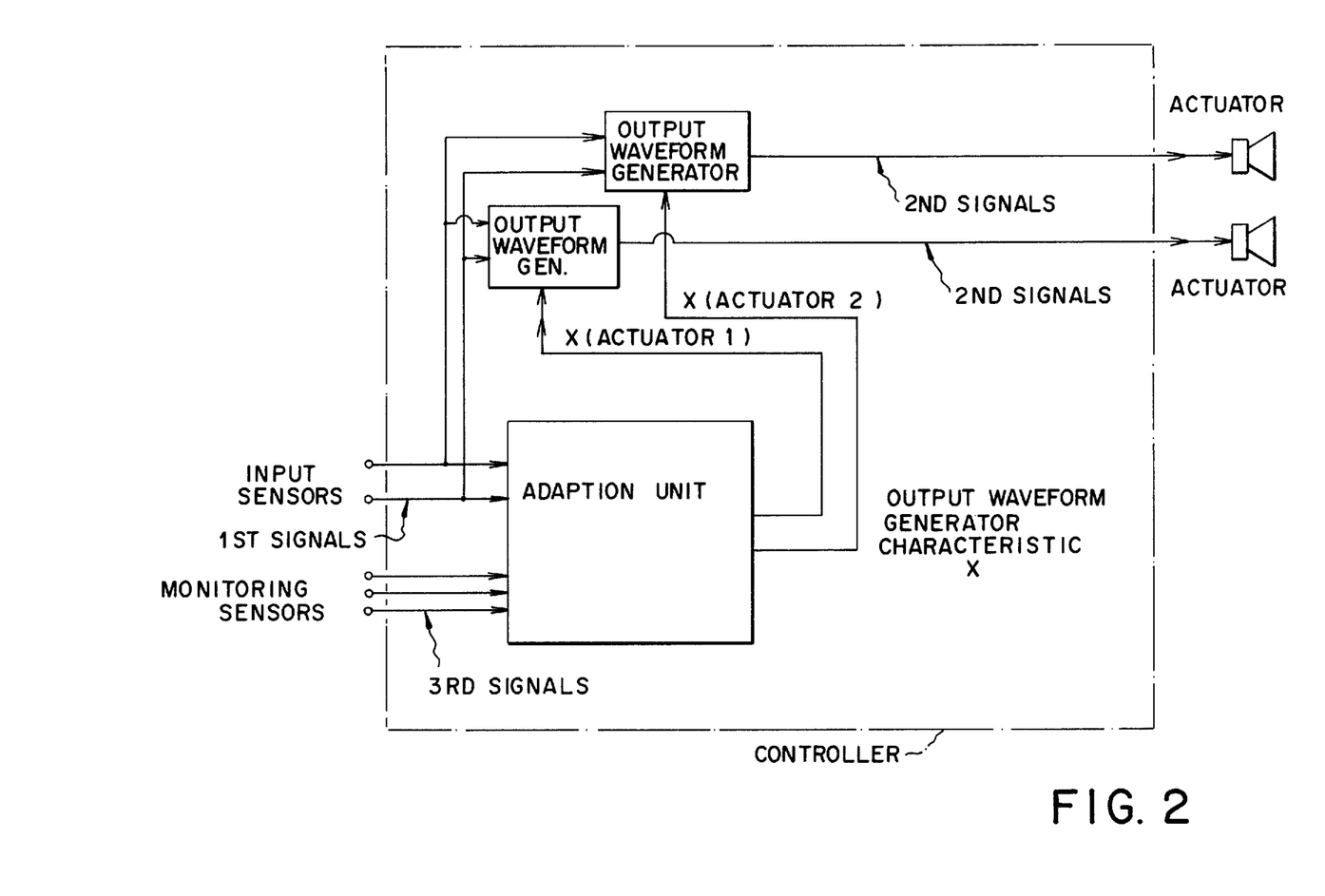
FIG. 2 is a diagrammatic view of another embodiment of the adaption process of the present invention.

Typically the adaption of the output waveform generators uses information from the first and third signals, and this may be in the form of one or more matrices. The above is shown in FIG. 2, which is a diagrmmatic view of a control system of the current invention.

The first signals may be cross correlated to form a cross correlation matrix and the latter may be employed in the adaption of the output waveform generators.

The first signals and third signals may be cross correlated to form a cross correlation matrix and the latter may be employed in the adaption of the output waveform generators.

According to another aspect of the invention, an active vibration control system comprises:

- at least two input sensors which generate first signals related to the phase and/or the amplitude of a primary vibration field or the sources which generate the primary vibration field;

a plurality of actuators driven by second signals which produce a secondary vibration field;

a plurality of monitoring sensors responsive to the combination of the said primary and secondary vibration fields and which produce third signals;

a controller including one output waveform generator for each second signal wherein each output waveform generator is responsive to the said first signals and generates one of the said second signals so that the combined effect of the second signals is that the vibration in a region, which is excited by the said primary and secondary vibration fields, tends to be reduced;

characterized in that the controller adapts the output waveform generators so that the vibration in the region is maintained at a reduced level, said adaption of the output waveform generators taking account of the cross correlation matrix of the first signals and/or the cross correlation matrix between the first and third signals.

Some input sensors may sense vibration in the field produced by vibration sources or may be associated with or linked to the source in such a way as to produce a signal indicative of the activity of the source which produces the vibration (e.g. rotation of a turbine).

Typically the adaption process employed is an iterative process involving an update.

Some or all of the adaption updates may be scaled by the reciprocal of the largest eigenvalue of the cross correlation matrix of the first signals.

Alternatively some or all of the adaption updates may use a modified form of the inverse of the cross correlation matrix of the first signals.

Some or all of the adaption updates may use a matrix derived from the eigenvectors and/or the eigenvalues or the cross correlation matrix of the first signals.

Some or all of the adaption updates may use a matrix which is selected to minimize the one-step-ahead residual vibration in the region.

Changes in the first signals may be cross correlated to form a cross correlation matrix of the changes in the first signals, and some or all of the adaption updates may use a matrix which is selected at least partly with reference to the said cross correlation matrix of the changes in the first signals.

Changes in the third signals occurring during an initial measuring or calibrating step when no secondary field is being generated may be cross correlated to form a cross correlation matrix of the changes in the third signals, or the cross correlation matrix of changes in the third signals may be calculated from estimates of what the third signals would be without the secondary field, and some or all of the adaption updates may use a matrix which is selected at least partly with reference to the said cross correlation matrix of the changes in the third signals.

The first signals and the noise (as hereinafter defined in equation 5) may be cross correlated to form a cross correlation matrix between the first signals and the noise, and some or all of the adaption updates may use a matrix which is selected at least partly with reference to the said cross correlation matrix between the first signals and the noise.

Where the first signals contain components attributable to the secondary vibration the latter is preferably subtracted from the outputs of the input sensors so that the first signals available for use by the controller do not contain any substantive components attributable to the secondary vibration.

The cross correlation matrix of the first signals may be stored as required in the controller.

The cross correlation matrix between the first and third signals may be stored in the controller.

The cross correlation matrix of the first signals (or the first and third signals) may be formed a least in part during an initial measuring or calibrating step or may be formed during the vibration reduction mode of operation of the controller or partly during an initial step and partly during a vibration reduction mode of operation of the controller.

Where the primary vibration field is produced by two or more sources each of which has a repetitive or periodic or quasi-periodic characteristic or any combination thereof and each input sensor is linked to a separate source and produces a first signal indicative of the repetitive or periodic or quasi-periodic activity of that source. The waveform generator may include a sampled-data system for each first signal each of which systems is supplied with a control signal derived from one of the said first signals.

Where there are two or more sources and therefore two or more sampled-data systems and each sampled-data system has to be synchronized, the synchronization may be achieved using some or all of the control signals derived from the said first signals.

Where there are two or more sources and therefore two or more sampled-data systems each sampled-data system may comprise a sampled-data filter (e.g. a digital filter) the input of which is supplied with one of the first signals, and the sample data filters may be synchronized from a single synchronizing signal.

In the present invention each output wave generator may be a device which produces a signal waveform which is responsive to two or more input signals. Each of these signals could be (i) a signal which is time related to one of the vibration sources or to the unwanted (primary) field such as in UK patent 1,577,322 (from a tachometer for example), or (ii) a signal which is time an amplitude related to the primary vibration, or (iii) a signal representative of the time or phase difference between the primary vibration or one of the vibration sources and some reference signal. This phase difference could, for example, be in the form of an angle difference for rotating machines or a timing difference.

The output wave generator can be a sampled-data device and can operate (i) as a fixed (uniform) time-base filter.

(ii) on a time-base of a reference signal, which could be one of the input signals, so that a specified number of output points are generated in each vibration cycle. This can be thought of as a synchronous sampled-data filter.

(iii) on multiple time-bases, each time-base corresponding to a reference signal which could be one of the input signals. This would be thought of as multiple synchronous sampled-data filters whose output is combined to produce the waveform generator output.

The sampled-data devices could be digital devices.

The invention also lies in the method by which the output wave generators are adjusted or adapted in response to the input (first) signals and the signals from the residual sensors (third signals), so that their combined effect is to tend to cancel the unwanted vibration.

DETAILED DESCRIPTION OF THE PREFERRED EMBODIMENT

In one particular embodiment of the invention in which the output wave generators are filters, the unwanted vibration is generated by two vibration sources and the two input signals are derived directly from the sources, one from each. The inputs to the controller at time t are $u_1(t)$ and $u_2(t)$ and the impulse responses of the corresponding filters for the n-th actuator are $x_1(n,t)$ and $x_2(n,t)$. The combined output (second) signal from the output waveform generator to the n-th actuator is $$x(n,t)=u_1(t)*X_1(n,t)+u_2(t)*x_2(n,t) \tag{1}$$

where * denotes convolution. In matrix notation we can write $$X(t) = \begin{array}{ll} X_1(1,t), & X_2(1,t) \\ X_1(2,t), & X_2(2,t) \\ \ldots & \ldots \\ \ldots & \ldots \\ \ldots & \ldots \\ X_1(N,t), & X_2(N,t) \end{array} \tag{2}$$

$$\underline{u}(t) = \begin{array}{l} u_1(t) \\ u_2(t) \end{array} \tag{3}$$

etc. so that $$\underline{x}(t)=X(t)*\underline{u}(t). \tag{4}$$

The third signal at the m-th sensor when no control is applied is $$y(m,t)=u_1(t)*y_1(m,t)+u_2(t)*y_2(m,t)+n(m,t) \tag{5}$$

where the first two terms on the right hand side are the contributions from the two vibration sources and $\underline{n}$ is the noise not associated with the vibration sources.

As above this can be written in matrix notation as $$\underline{y}(t)=Yt)*\underline{u}(t)+\underline{n}(t). \tag{6}$$

The residual signal at the M microphones is $$\underline{e}(t)=\underline{y}(t)+A(t)*\underline{x}(t), \tag{7}$$

where A(t) is the matrix of responses describing the way in which impulses from a controller output (second signals) affect the (third) signals from he residual sensors.

In the case where $\underline{y}_1$ and $\underline{y}_2$ can be identified separately the first filter output $\underline{X}_1$ can be used to cancel $\underline{y}_1$ since it is assumed to be well correlated with $u_1$, and the second used for $\underline{y}_2$. The signal processing approach used in Eatwell and Ross sought to separate the components in the residual signals. This cannot be done accurately unless the signals are sufficiently noise-free or the constituent components remain constant for a long time. However, the current invention recognizes that when separation is difficult, as in the case of synchrophased propellers, it is also unnecessary since the aim of an active control system is only to reduce the unwanted vibration.

The primary vibration can be thought of as a sum of independent (uncorrelated) components. These correspond to the contributions from the individual sources only when the input signals themselves are uncorrelated. The method is best explained in terms of these components.

A measure of the degree of correlation is given by the off-diagonal elements of the cross-correlation matrix of the first signals which is defined by $$C(T)=<\underline{uu}^T>=<u_1(t)u_1(t+T)><u_1(t)u_2(t+T)><u_2(t)u_1(t+T)><u_2(t)u_2(t+T)> \tag{8}$$

The angle brackets denote expectations which can be approximated by short term time averages. This definition is for two input (first) signals but the extension of this definition to more than two first signals is obvious. This can be transformed to the frequency domain, in which case it could be called the cross spectrum matrix. However. the use of the term cross correlation matrix should be taken to include the frequency domain equivalents. In the particular case when the input signals do not contain any amplitude information they can be normalized so that the diagonal elements of the matrix are unity, giving the complex matrix $$C(f) = \begin{array}{ll} 1 & B(f) \\ B^*(f) & 1 \end{array} \tag{9}$$

where B(f) is the Fourier transform of $<u_1(t)u_2(t+T)>$, f is the frequency and the superposed * denotes complex conjugation.

In the frequency domain, when $u_1$ and $u_2$ are suitable normalized, $$u_2(f)u_1*(f)=\exp(i2\pi ft), \tag{10}$$

where t is the time between the start of a cycle of one vibration source and the start of a cycle of the other source. When the sampling is synchronized to one source $$u_2(nf_O)u_1*(nf_O)=\exp(in\theta), \tag{11}$$

where $f_O$ is the fundamental frequency, n is the harmonic number and $\theta=2\pi f_O$ t is phase angle between the sources.

The complex Hermitian matrix C can be decomposed as $$C(f)=d_1\underline{v}_1\underline{v}_1*+d_2\underline{v}_2\underline{v}_2* \tag{12}$$

where the eigenvectors are $$d_1=1+R \text{ and } d_2=1-R, \tag{13}$$

R is the modulus of B(f). The eigenvectors are $$\underline{v}_1=\{\exp(\text{argB}), 1\}^T/\text{sqrt}(2) \tag{14}$$

and $$\underline{v}_2=\{\exp(\text{argB}),-1^T/\text{sqrt}(2), \tag{15}$$

where argB is the argument of B and exp(.) is the exponential function.

A common way of measuring the performance of a control system is to calculate the mean square error at the residual sensors. This is denoted by $$E=\text{trace}<e(f)e(f)*>. \tag{16}$$

This is most useful when Y and X are only changing very slowly. We look at this case first in order to illustrate the importance of the cross-correlation matrix.

Using equations 4, 6 and 7 this can be written as $$E=\text{trace}\{(Y+AX)C(Y+AX*\}+<\underline{n}*\underline{n}>, \tag{17}$$

or $$E + (Y+AX)^* \underline{v}_1\underline{v}_1^*(Y+AX)d_1 + (Y+AX)^*\underline{v}_2\underline{v}_2^*(Y+AX)d_2 + <\underline{n}*\underline{n}>. \quad (18)$$

When the two vibration sources are well correlated R is close to unity and the first eigenvalue is much larger than the second. Hence, if $Y\underline{v}_1$ and $Y\underline{v}_2$ are of similar size we see that the first term on the right hand side gives a much larger contribution to the error E than does the second. This indicates that it may not be important to obtain a good estimate of this second component.

However, the matrix Y is not measured directly, so we must use the alternative expression $$E = \text{trace} <(y+AX\underline{u})(y+AX\underline{u})^*> = \text{trace}\{<\underline{v}^*\underline{v}> + AX<\underline{u}\underline{y}^*> + <\underline{y}\underline{u}^*>X^*A^* + AX<\underline{u}\underline{u}^*>X^*A^*\} \quad (19)$$

The optimal solution for X is $$X = -(A^*A)^{-1}A^*<\underline{y}\underline{u}^*>C^{-1}, \quad (20)$$

where $$C^{-1} = \underline{v}_1\underline{v}_1^*/d_1 + \underline{v}_2\underline{v}_2^*/d_2, \quad (21)$$

Thus the cross-correlation is used in the calculation of the optimal actuator drive signals.

The calculation assumes that both A and u are known. In practice they cannot be known exactly. The effect of these inaccuracies are largest when the matrix C is poorly conditioned, that is when $d_2$ is small. The error is then increased by a factor which scales on the noise level and on $d_2/h_2$, where $h_2$ is the estimate of $d_2$ used in the calculation of $c^{-1}$. In addition the solution for X, even if it is accurate in the mean, is highly sensitive to the measurement noise.

This can be demonstrated by looking at the effect of errors in the eigenvalues of C. If $h_1$ and $h_2$ are the estimates of the eigenvalues we can write the estimate of $c^{-1}$ as $(I+c)c^{-1}$ where $$c = \underline{v}_1\underline{v}_1^*(d_1/h_1 - 1) + \underline{v}_2\underline{v}_2^*(d_2/h_2 - 1), \quad (22)$$

and I is the identity.

From this it is clear that the error c is most likely to be large whenever $h_2$ is small.

The resulting mean square error, when A is known exactly and can be inverted, can be shown to be increased by an absolute amount $$<\underline{u}\underline{y}^*>cC^{-1}c<\underline{y}\underline{u}^*>. \quad (23)$$

The error relative to the primary vibration is therefore increased by an amount depending on c and on the coherence between u and y. One factor affecting this coherence is the signal to noise ratio, $s = <\underline{y}^*\underline{y}>/<\underline{n}^*\underline{n}>$.

One aspect of the current invention is to use a modified estimate of $C^{-1}$ such as $$D^{-1} = \underline{v}_1\underline{v}_1^*/d_1 + \underline{v}_2\underline{v}_2^*/g(d_2) \quad (24)$$

where $g(d_2)$ is a function which tends to increase $d_2$ when it is small and leave it unchanged if it is large enough. The scaling of this function can be determined by the signal to noise ratio, s, or by any other measure of the noise or the coherence. One such measure which can be measured "on-line" is $$<\underline{u}^*\underline{e}><\underline{e}^*\underline{u}>/\{<\underline{n}^*\underline{n}><\underline{u}^*\underline{u}>\}. \quad (25)$$

In most applications the primary vibration field is changing, this means that an adaptive control scheme must be used.

The adaptive scheme takes the form $$x^{j+1} = x^j - \mu R <\underline{e}^j\underline{u}^{j*}>Q \quad (26)$$

where $\mu$ is a convergence parameter and R and Q are matrices to be chose, and $<\underline{e}^j\underline{u}^{j*}>$ is the cross correlation matrix of the first and third signals. The expectation denotes a combination of measurements such as an average or exponentially weighted average and includes the case where a single measurement is used. Typical expressions for R when there is a single vibration source are $$R = A^* \text{ or } R = (A^*A + \delta I)^{-1}A^* \quad (27)$$

where $I\delta$ is the identity matrice and is a small positive number included to improve the conditioning of the matrix inversion. These expressions can be used for the multiple source case described here.

The choice of the matrix Q, which constitutes one aspect of this invention, is $$Q = \underline{v}_1\underline{v}_1^* \cdot f(d_1) + \underline{v}_2\underline{v}_2^* \cdot g(d_1, d_2). \quad (28)$$

Another aspect of this invention is the choice of the functions f and g and the convergence parameter $\mu$.

We shall do this by examining the performance of the algorithm. This can be done by looking at the change in the residual signal after one iteration of the update system. The error after the j-th iteration is $$\begin{aligned}\underline{e}^{j+1} &= y^{j+1} + (AX^j - \mu AR<\underline{e}^j\underline{u}^{j*}>Q)\underline{u}^{j+1} \\ &= (\underline{y}^{j+1} - \underline{y}^j) + (E^j - \mu ARE^j<\underline{u}^j\underline{u}^{j*}>Q)\underline{u}^j - \\ & \quad \mu AR<\underline{n}^j\underline{u}^{j*}>Q\underline{u}^j + Ax^{j+1}(\underline{u}^{j+1} - \underline{u}^j)\end{aligned} \quad (29)$$

$$E^j = Y^j + Ax^j \quad (30)$$

and $$x^{j+1} = x^j - \mu R E^j <\underline{u}^j\underline{u}^{j*}>Q - \mu R<\underline{n}^j\underline{u}^{j*}>Q. \quad (31)$$

The term $<\underline{u}^j\underline{u}^{j*}>Q$ can be written as $$<\underline{u}^j\underline{u}^{j*}>Q = CQ = \underline{v}_1\underline{v}_1^*d_1 f(d_1) + \underline{v}_2\underline{v}_2^*d_2 g(d_1 d_2). \quad (32)$$

$<(\underline{y}^{j+1} - \underline{y}^j)(\underline{y}^{j+1} - \underline{y}^j)^*>$ is the cross correlation matrix of the changes in the third signals which would occur if the secondary field were not produced.

$<(\underline{u}^{j+1} - \underline{u}^j)(\underline{u}^{j+1} - \underline{u}^j)^*>$ is the cross correlation matrix of the changes in the first signals. $<\underline{n}^j\underline{u}^{j*}>$ is the cross correlation between the noise and the first signals. Equation (29) shows that there are four contributions to the new residual vector. The first term represents the change in the primary noise field, this can only be reduced by increasing the update rate. The second represents the error that would occur in a noise-free situation where the vibration sources were not changing. This term can be reduced by choosing $\mu$ to be unity, choosing R such that AR is close to the identity matrix, and by choosing Q to be close to $C^{-1}$. The terms involving $n_j$ is additional noise introduced by the adaption algorithm. This term can be reduced by making $\mu$, R or Q small (which is in conflict with reducing the second term) or by combining more measurements (which is in conflict with reducing the first term). The last term is proportional to the change in the input vector $\underline{u}$. This can be reduced by increasing the update rate. It is also proportional to $x^{j+1}$ which is affected by the choice of $\mu$ and Q. In particular, when the function g is large, $x^{j+1}$ as given in equation 31 contains a large noise term.

The functions f and g may be chosen so as to minimize the one step ahead residual and so they depend upon the noise levels and the rate of change of the input vector $\underline{u}$. The choice μ may then be made with reference to f and g. We shall now give some examples.

One choice for Q uses $f(d_1)=g(d_1,d_2)=1$, which gives Q=I, the identity. Upon substituting equation 30 into equation 29 it is clear that for convergence of the algorithm.

$$0<\mu<2/\{d_1.\text{norm}(AR)\}, \quad (33)$$

where norm(.) denotes the matrix norm. Hence the update scales on the largest eigenvalue of the cross-correlation matrix c.

Another choice is $f(d_1)=1/d_1$ and $g(d_1,d_2)$ is some function which tends to a fixed value when $d_2$ is very small and tends to $1/d_2$ when $d_2$ is sufficiently large. For example $g(d_1d_2)=1/\text{sqrt}(d_1, d_2)$ which ensures that the amplification of the noise is not too large. Q is then close to the inverse of the cross-correlation matrix C. For this case the algorithm converges provided.

$$0<A<2/\text{norm}(AR). \quad (34)$$

The foregoing analysis shows that the choice of functions f(.) and g(.) which will minimize the one-step ahead residual noise will depend upon the dynamics of the vibration sources and upon the noise levels. Hence the choice of the functions f(.) and g(.) may be made, for a particular application, with reference to the dynamics of the vibration sources and/or the noise levels in such a way as to reduce the expected value of the one-step ahead residual noise. One way this choice may be made is to calculate or estimate the terms of equation 29 and select the functions which minimize the left hand side.

Figure 1:
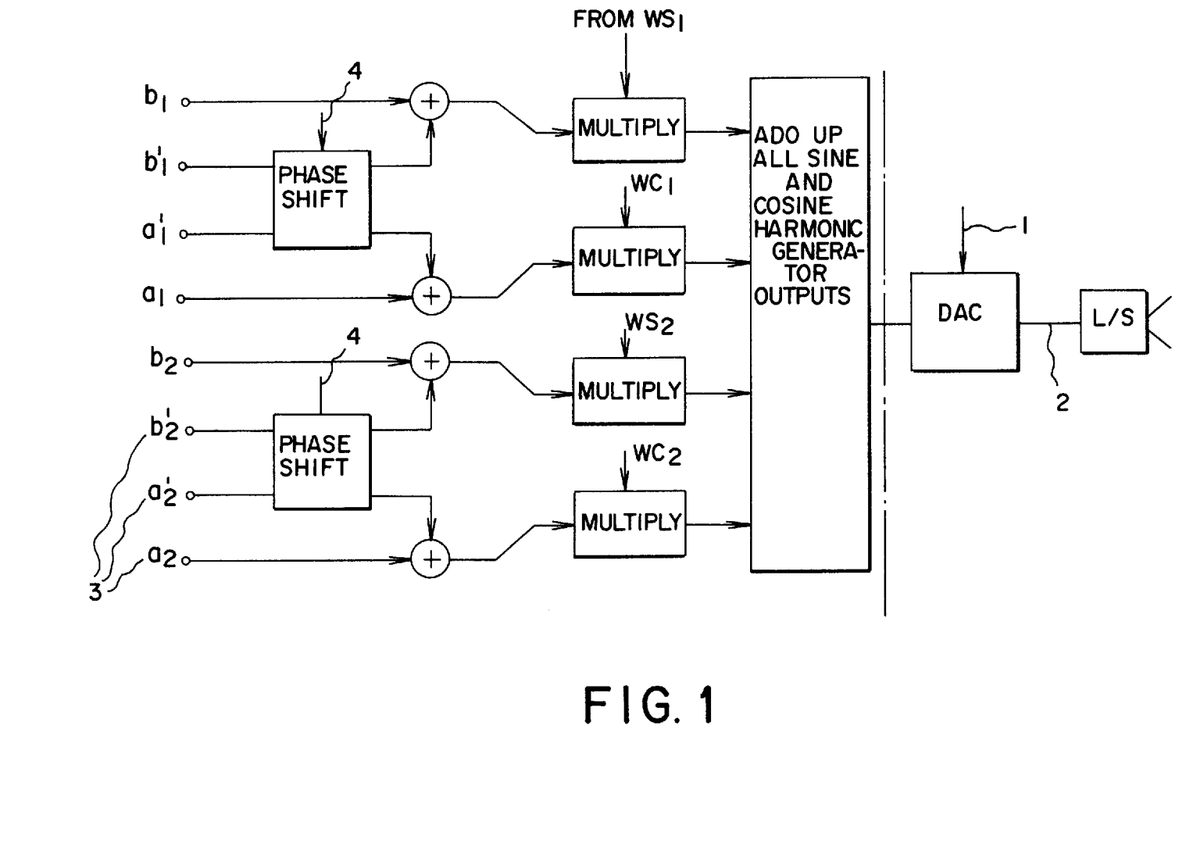
FIG. 1 is a diagrammatic view showing the treatment of an output waveform generator according to one embodiment of the present invention.

The invention may be applied to control the propeller noise in an aircraft with two propellers. This example is now described with reference to the accompanying drawing, in which FIG. 1 shows one type of output waveform generator. Each output waveform generator (for simplicity sake only one is shown) receives a tachometer pulse train, 1, from one of the propellers and generates the anti-sound (second) signal, 2, for each loudspeaker in synchronization with it (again only one loudspeaker is shown for reasons of simplicity). The phase and amplitude of the loudspeaker signals are governed by output weighing coefficients, 3, which are adjusted by the adaptive algorithm.

A discrete Fourier transform of equation (1) allows each harmonic component of the output signal, X, to be considered separately. The complex component for actuator n, at the fundamental frequency, $f_O$, is given by $$X(n,f_0) = [X_1(n,f_0) \; X_2(n,f_0)] \begin{bmatrix} u_1(f_0) \\ u_2(f_0) \end{bmatrix}$$

where $x_1(n,f_O)=a_1+i\cdot b_1$ $X_2(n,f_O)=a_1'+i\cdot b_1'$ and $u_1(f_O)=1,$ $u_2(f_O)=e^{i\theta}$ and where θ is the phase angle between the two sources.

Figure 3:
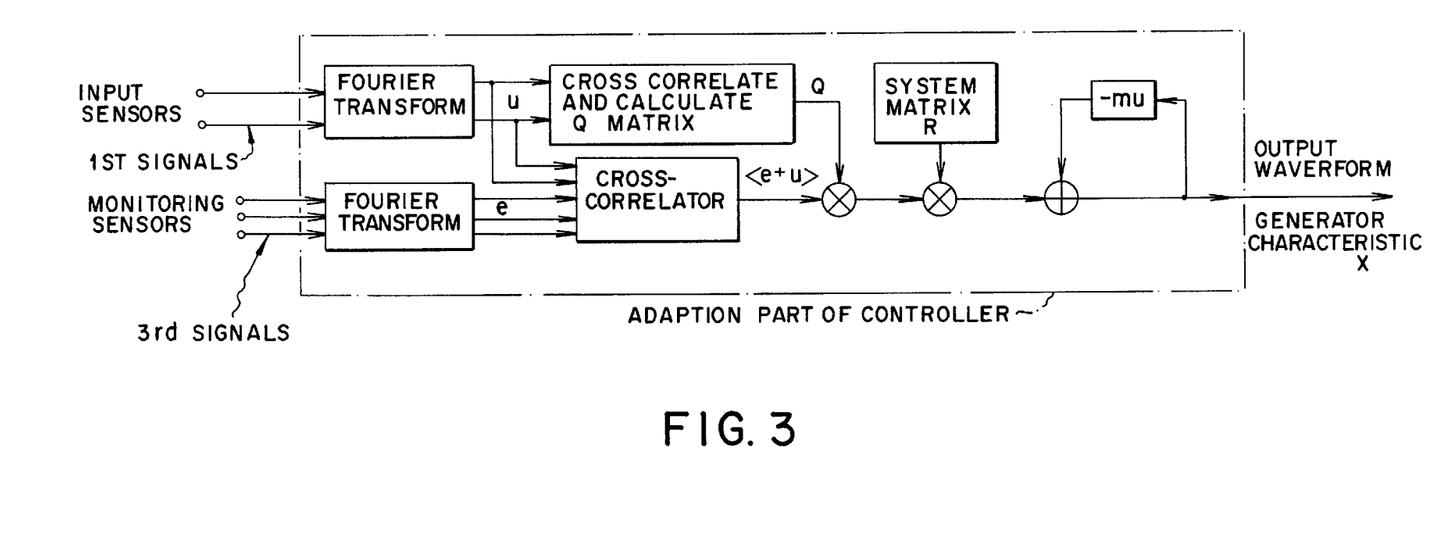
FIG. 3 is a diagrammatic view of a further embodiment of the adaption process of the present invention.

The component at the second harmonic (i.e. with frequency $2\cdot f_O$ is given by $$X(n,2\cdot f_0) = [X_1(n,2\cdot f_0) \; X_2(n,2\cdot f_0)] \begin{bmatrix} u_1(2\cdot f_0) \\ u_2(2\cdot f_0) \end{bmatrix}$$

where $x_1(n,2f_O)=a_2+i\cdot b_2$ $X_2(n,2f_O)=a_2'+i\cdot b_2'$ $u_1(2f_O)=1,$ $u_2(2f_O)=e^{2i\theta}$ So that in general the component at the $j^{th}$ harmonic (i.e. with frequency $j\cdot f_O$ is given by $$X(n,j\cdot f_0) = [X_1(n,j\cdot f_0) \; X_2(n,j\cdot f_0)] \begin{bmatrix} u_1(j\cdot f_0) \\ u_2(j\cdot f_0) \end{bmatrix}$$

where $X_1(n, j\cdot f_O)=a_j+i\cdot b_j$ $x_2(n,2\cdot f_O)=a_j'+i\cdot b_j'$ $u_1(j\cdot f_O)=1$ $u_2(j\cdot f_O)=e^{ji\theta}$ Each component can be updated according to equation (26) for example, in which for each frequency $jf_O$, $$X(jf_0) = \begin{bmatrix} X_1(1,jf_0) & X_2(1,jf_0) \\ X_1(2,jf_0) & X_2(2,jf_0) \\ X_1(3,jf_0) & X_2(3,jf_0) \\ \cdots & \cdots \\ X_1(L,jf_0) & X_2(L,jf_0) \end{bmatrix}$$

Where L is the number or actuators. A diagrammatic representation of the use of equation (26) to adapt the complex harmonic components is shown in FIG. 3, which is a diagrammatic view of one embodiment of the adaption process of the present invention. Each of the first signals and third signals is Fourier transformed. The cross-correlation matrix <eu*> is then formed in the cross-correlator and the matrix Q is calculated from the transformed first signals according to equation (28). The elements $X_1(n,jf_O)$ and $X_2(n,jf_O)$ are then passed to the output waveform generator for harmonic j and actuator n. The times series outputs, which constitute the second signals, are then generated as shown in FIG. 1.

The values of $a_j$ and $b_j$, are the cosine and sine output weighting coefficients of the anti-sound signal for propeller 1, for each loudspeaker (at each harmonic j), and the values of $a'_j$ and $b'_j$, are the coefficients for propeller 2. $a_1$ is cosine output weighting coefficients of the anti-sound signal for propeller 1 at harmonic 1, $b_1$ is sine output weighting coefficients of the anti-sound signal for propeller 1 at harmonic 1, $a'_1$ is cosine output weighting coefficients of the anti-sound signal for propeller 2 at harmonic 1, and $b'_1$ is sine output weighting coefficients of the anti-sound signal for propeller 2 at each harmonic 1. These output weighing coefficients are adjusted by the adaptive algorithm once per adaptive update. Regularly the phase signal, 4, or a timing signal from which the phase is derived, is re-measured and used to combine the values of $a_j$, $a'_j$, $b_j$, and $b'_1$ according to the equation:

$$c = a + a'Cp - b'Sp$$

$$d = b + b'Cp + a'Sp$$

(the subscript j has been dropped for clarity)
where:
c is the combined coefficient for the cosine generator,
d is the combined coefficient for the sine generator,
Cp is the cosine of the phase angle (of propeller 2 relative to propeller 1), and
Sp is the sine of the phase angle.

Each time a pulse is received from the tachometer pulse train the output to each loudspeaker is calculated according to the equation:

$$x(I) = c_j Wc_j(i) + d_j WS_j \qquad (i)$$

where $Wc_j(i)$ is a stored cosine wave of harmonic number j, $WS_j(i)$ is a stored sine wave of harmonic number j. This represents the sum of the cosine and sine generator outputs weighted by the coefficients $c_j$ and $d_j$ and summed for each harmonic j. In FIG. 1, two harmonics are being controlled.

The adaption the controller may be done with reference to the third signals from microphones in the cabin. These could be used to adjust the output weighting coefficients a and b (or $a^1$ and $b^1$), which are subsequently used by the output waveform generators to create the anti-sound signals.

Other embodiments of the invention could use more than two input signals and could have different forms of output wave generators.

We claim:

1. An active vibration control system comprising:
   at least two input sensors which generate first signals related to at least one characteristic of a primary vibration field or of the sources which generate the primary vibration field, said input sensors determining a cross-correlation matrix of said first signals from said at least two input sensors,
   a plurality of actuators driven by second signals which produce a secondary vibration field,
   a plurality of monitoring sensors responsive to the combination of said primary and secondary vibration fields and which produce third signals,
   a controller including one output waveform generator for each second signal wherein each output waveform generator is responsive to said first signals and generates one of the said second signals so that the combined effect of the second signals is that the vibration is a region, which is excited by the said primary and secondary vibration fields, tends to be reduced,
   characterized in that the input sensors generate said first signals related to the phase and amplitude of the primary vibration field or of the sources which generate said primary vibration field, and in that the controller adapts the output waveform generators so that the vibration in the region is maintained at a reduced level, said adaption of the output waveform generators taking account of said cross correlation matrix of said first signals.

2. A system as claimed in claim 1, wherein the controller adapts the output waveform generators in response to a cross correlation matrix between the first and third signals.

3. An active vibration control system comprising:
   at least two input sensors which generate first signals related to the phase and the amplitude of a primary vibration field or the sources which generate the primary vibration field,
   a plurality of actuators driven by second signals which produce a secondary vibration field,
   a plurality of monitoring sensors responsive to the combination of the said primary and secondary vibration fields and which produce third signals, said input sensors and said monitoring sensors determining a cross-correlation matrix between said first and third signals,
   a controller including one output waveform generator for each second signal wherein each output waveform generator is responsive to the said first signals and generates one of the said second signals so that the combined effect of the second signals is that the vibration in a region, which is excited by the said primary and secondary vibration fields, tends to be reduced,
   characterized in that the controller adapts the output waveform generators so that the vibration in the region is maintained at a reduced level, said adaption of the output waveform generators taking account of said cross correlation matrix between said first and said third signals.

4. A system as claimed in claim 2 wherein the adaption of the output waveform generators operates in accordance to $$x^{j+1} = x^j - \mu R < \underline{e}^j \underline{u}^{j*} > Q$$

where $x^j$ is the matrix of output coefficients, $\mu$ is a convergence parameter, R is a matrix related to the system response, $<\underline{e}^j \underline{u}^{j*}>$ is the cross-correlation matrix between the first signals and the third signals and Q is a matrix calculated from a cross correlation matrix of the first signals.

5. A system as claimed in claim 4 in which the matrix Q depends upon the largest eigenvalue of the cross correlation matrix of the first signals.

6. A system as claimed in claim 4 in which the matrix Q is a modified form of the inverse of a cross correlation matrix of the third signals.

7. A system as claimed in claim 4 in which the matrix Q is derived from the eigenvectors and eigenvalues of the cross correlation matrix of the first signals.

8. A system as claimed in claim 7, wherein one of the matrices used in the adaption of the output waveform generators is chosen to minimize the one-step-ahead residual vibration in the region.

9. A system as claimed in claim 8, wherein one of the matrices used in the adaption of the output waveform generators is chosen at least partly with reference to the estimate of the cross correlation matrix of the changes in the first signals.

10. A system as claimed in claim 9, wherein one of the matrices used in the adaption of the output waveform generators is chosen at least partly with reference to the estimate of the cross correlation matrix of the changes in the third signals which would occur without the secondary vibration.

11. A system as claimed in claim 10, wherein the cross correlation matrix of the first signals is stored in the controller.

12. A system as claimed in claim 11, wherein the cross correlation matrix between the first and third signals is stored in the controller.

13. A system as claimed in claim 12, wherein the cross correlation matrix between the first signals is estimated during operation of the controller.

14. A system as claimed in claim 13, wherein the cross correlation matrix between the first and third signals is estimated during operation of the controller.

15. A system as claimed in claim 14 wherein the response of the input sensors to the secondary vibration is subtracted from their output so that the first signals are substantial insensitive to the secondary vibration.

16. A system as claimed in claim 15 wherein part of at least one of the output waveform generators is a filter which has a time-base synchronized to the rotation rate of timing of one of the vibration sources.

17. A system as claimed in claim 16, wherein part of at least one of the output waveform generators receives an additional signal related to the relative phase or timing of another vibration source.

18. A system as claimed in claim 17 wherein part of at least one of the output waveform generators is a filter which operates on a uniform time-base and which receives a signal related to the phase or timing of one vibration source.

* * * * *